Nov. 8, 1960     H. C. HILL     2,959,433
SEAL
Filed April 5, 1957
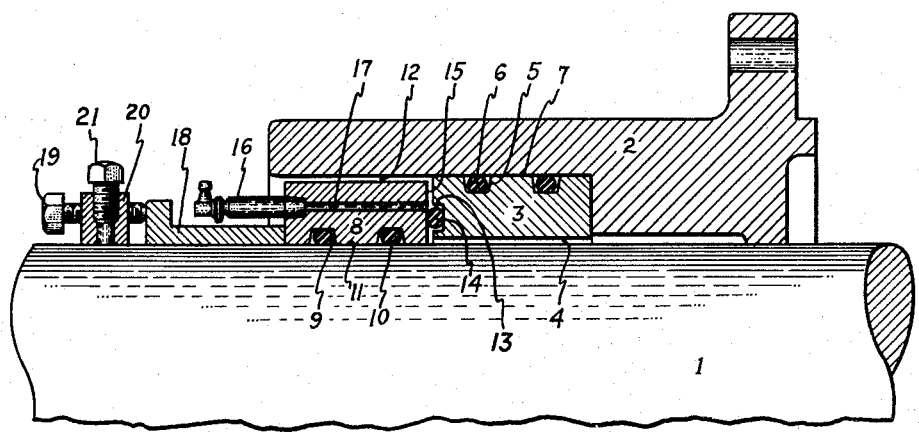
Inventor,
Harold C. Hill,
by Gilbert P. Tarleton
His Attorney.

United States Patent Office 2,959,433
Patented Nov. 8, 1960

2,959,433

SEAL

Harold C. Hill, Baltimore, Md., assignor to General Electric Company, a corporation of New York Filed Apr. 5, 1957, Ser. No. 650,896

1 Claim. (Cl. 286—11.13)

This invention relates to a seal, and more particularly, to a fluid tight seal for a rotatable shaft.

In pug mills of the type shown in Skipper Patent 2,572,063 for extruding ceramic clay the extruding auger comprises a rotatable shaft having a plurality of blades thereon. The shaft extends through a stuffing box type seal and bearings into a vacuum chamber, and the blades are positioned in the vacuum chamber. The side of the vacuum chamber which is opposite to the stuffing box and bearings opens into a nozzle through which the extruding auger extrudes the clay.

When the clay which is to be extruded enters the vacuum chamber it contains entrapped air. This entrapped air is removed in the vacuum chamber in order to obtain defect free extruded clay pug. A vacuum is maintained in the chamber despite the fact that the inlet and outlet entrances of the chamber are open to the atmosphere by moving the processed clay through the pug mill at the proper rate of flow so that these entrances are closed by the processed clay itself. Also, the vacuum is maintained by the aforementioned stuffing box seal for the extruding auger as well as other seals.

However, considerable difficulty has been encountered in obtaining an effective vacuum seal at the stuffing box for the shaft. The part of the shaft which extends to the extrusion nozzle and carries the blades has large forces applied thereto, and this part of the shaft is not supported. Since it is not supported it may vibrate laterally, and not turn about its true axis, a condition known in the art as shaft run out. Vibrations and shaft run out result in bearing and stuffing box wear whereby the stuffing box is no longer effective as a seal.

It is an object of this invention to provide an improved seal which will permit considerably more bearing wear and shaft run out than permitted by the conventional stuffing box and still function effectively.

In the preferred form of my invention the shaft is sealed by two side by side collars which are disposed about the shaft. The inner collar is provided with considerable clearance between itself and the shaft. Also, it fits rather closely into the surrounding seal housing, and a pair of compressed sealing rings are disposed between the inner collar and the housing. The outer collar fits rather closely about the shaft and another pair of compressed sealing rings are disposed between these two members. The inner collar is stationary and the outer collar is rotatable with and movable axially along the shaft. A sealing ring is positioned between the adjacent ends of the two collars and these two collars are urged towards each other to compress this sealing ring. Vacuum pressure exists in the clearance between the inner collar and the shaft. Atmospheric pressure will not pass along the outside of the outer collar past the last mentioned seal since the pressure differential continuously urges the outer collar against the inner collar to compress the seal. Also, this arrangement of the parts permits considerable shaft run out and vibration before the effectiveness of any of the sealing rings is destroyed.

While the specification concludes with claims particularly pointing out and distinctly claiming the subject matter which I regard as my invention, it is believed the invention will be better understood from the following description taken in conjunction with the accompanying drawing in which the single figure shows a sectional view of a preferred form of my invention.

In the drawing is shown a shaft 1 which passes through a cylindrical seal and bearing housing 2, although the bearings are not illustrated. In a pug mill the not shown vacuum chamber is along the right-hand side of the shaft and housing.

A cylindrical inner sleeve or collar 3 is positioned between the shaft and housing. Considerable clearance 4 is provided between the collar 3 and shaft 1. The collar 3 has a close fit in the housing 2. The collar 3 has a pair of spaced outer seal grooves 5 formed therein for receiving a pair of compressed sealing rings 6. The sealing rings 6 seal the cylindrical interface 7 between the collar 3 and housing 2 and also center the collar with respect to the housing 2.

Positioned next to the inner collar 3 is an outer collar 8. This collar 8 fits closely about the shaft 1 and has a pair of spaced inner seal grooves 9. A pair of sealing rings 10 in the grooves 9 seal the interface 11 between the collar 8 and shaft 1 and also center the collar 8 with respect to the shaft 1. The collar 8 rotates with the shaft whereas the collar 3 is stationary as is the housing 2.

The clearance 4 permits considerable shaft vibration or run out before the forces of shaft vibration or run out are transmitted to the parts 3, 6 and 2. For a similar reason with respect to parts 2, 8 and 10 a clearance 12 is provided between collar 8 and housing 2. However, it will be appreciated that housing 2 need not be extended beyond the left-hand end of collar 3 although I prefer to do so to protect a sealing ring 14 from dirt and the like.

Formed in the left-hand end face of collar 3 is a seal groove 13 which receives a sealing ring 14. The right-hand end surface 15 of collar 8, which can be hardened, smoothed and chrome plated bears against the sealing ring 14 to compress the same in a manner to be explained hereinafter.

The member 16 is a grease fitting which communicates with an oil or grease groove 17 formed in collar 8 so that the sealing ring 14 and face 15 can be lubricated. Positioned on the shaft 1 and to the left of collar 8 is another sleeve 18. An adjustable member 19 is carried by a ring 20 which is fixed to the shaft 1 to the left of sleeve 18 by a bolt 21. The member 19 can comprise a threaded bolt, and the sleeve 18 and collar 8 are axially slidable along the shaft 1. Therefore, when the bolt 19 is turned to move to the right the sleeve 18 urges the collar 8 to the right so that the face 15 compresses the sealing ring 14 between the collars 8 and 3. In this manner a vacuum seal is provided between the not shown vacuum chamber on the right-hand side of the shaft 1 and housing 2 and atmospheric pressure which exists along the left-hand side of shaft 1 and housing 2.

Also, the effectiveness of the sealing ring 14 lasts throughout long periods of operation of the pug mill aside from the initial setting of bolt 19. This is because vacuum pressure exists in the clearance 4 and inside the sealing ring 14 whereas atmospheric pressure exists outside the sealing ring 14 and within the clearance 12 or outside the collar 8. This pressure differential is effective to continuously urge the face 15 against the sealing ring 14 to compress the same.

A further advantage of my invention is that its simplicity permits quick replacement of the sealing ring 14 should it become ineffective due to wear or dirt. A new sealing ring can be installed merely by loosening the bolt 21 and moving the ring 20 to the left. If the housing 2 does not extend beyond the collar 3 then this can be done merely by backing off the bolt 19. Of course, if the shaft 1 is not discontinuous and joined by a removable spacer and coupling in a manner well known in the art the sealing ring 14 would have to be split to avoid disassembly of the machine in order to get the sealing ring on the shaft 1. However, in those cases where the left end of the shaft 1 is discontinuous and joined by a not shown removable spacer and coupling unsplit and continuous new sealing rings can be installed merely by removing the removable spacer and coupling. The sealing rings such as 6, 7 and 14 can be made from elastic material such as rubber so that they can be expanded during their installation to clear the parts 8, 16 and 18—21.

While there has been shown and described a particular embodiment of the invention, it will be obvious to those skilled in the art that changes and modifications may be made without departing from the invention, and therefore, it is intended by the appended claim to cover all such changes and modifications as fall within the true spirit and scope of the invention.

What I claim as new and desire to secure by Letters Patent of the United States is:

A seal arrangement comprising a stationary housing having a vacuum chamber surrounded by atmospheric pressure, a rotary shaft entering said chamber, and a seal assembly for said shaft comprising inner and outer collars which are positioned end to end and concentrically about said shaft, said outer collar being directly sealed to, rotary with, and axially slidable along said shaft, said inner collar being spaced from said shaft by considerable clearance, said stationary housing surrounding said inner collar and said inner collar being sealed to and stationary with said housing, and a compressible sealing ring about said shaft between the adjacent ends of said collars, said clearance being in communication with said vacuum chamber and the outside of said outer collar being exposed to said atmospheric pressure whereby the resultant pressure differential continuously urges said outer collar toward said inner collar to compress said sealing ring therebetween.

References Cited in the file of this patent

UNITED STATES PATENTS

| | | |
|---|---|---|
| 2,768,011 | Mosher | Oct. 23, 1956 |
| 2,887,332 | Lazar | May 19, 1959 |

FOREIGN PATENTS

| | | |
|---|---|---|
| 616,922 | Great Britain | Jan. 28, 1949 |
| 267,478 | Switzerland | June 16, 1950 |

OTHER REFERENCES

Chemical Engineering, published September 1956, page 201.